(12) United States Patent
Stork

(10) Patent No.: US 8,931,234 B2
(45) Date of Patent: Jan. 13, 2015

(54) CHINESE DRYWALL FIX

(71) Applicant: David J. Stork, Fenton, MI (US)

(72) Inventor: David J. Stork, Fenton, MI (US)

( * ) Notice: Subject to any disclaimer, the term of this patent is extended or adjusted under 35 U.S.C. 154(b) by 0 days.

(21) Appl. No.: 13/746,588

(22) Filed: Jan. 22, 2013

(65) Prior Publication Data

US 2013/0186032 A1    Jul. 25, 2013

Related U.S. Application Data

(60) Provisional application No. 61/632,453, filed on Jan. 24, 2012.

(51) Int. Cl.
| | | |
|---|---|---|
| *E04G 23/00* | (2006.01) | |
| *E04G 23/02* | (2006.01) | |
| *B01D 53/50* | (2006.01) | |
| *B01D 53/52* | (2006.01) | |
| *B01D 53/82* | (2006.01) | |

(52) U.S. Cl.
CPC ............... *E04G 23/00* (2013.01); *E04G 23/02* (2013.01); *B01D 53/508* (2013.01); *B01D 53/523* (2013.01); *B01D 53/82* (2013.01); *B01D 2251/108* (2013.01); *B01D 2251/304* (2013.01); *B01D 2251/306* (2013.01); *B01D 2251/402* (2013.01); *B01D 2251/404* (2013.01); *B01D 2251/602* (2013.01); *B01D 2251/604* (2013.01); *B01D 2251/606* (2013.01); *B01D 2253/102* (2013.01); *B01D 2257/306* (2013.01); *B01D 2259/4508* (2013.01)
USPC ............................................ 52/741.1; 52/514

(58) Field of Classification Search
CPC .... E04G 23/02; B01D 53/02; B01D 53/1481; B01D 53/1468
USPC ..................... 52/514, 741.1; 95/95, 135, 136; 423/243.01, 244.01
See application file for complete search history.

(56) References Cited

U.S. PATENT DOCUMENTS

| | | | | |
|---|---|---|---|---|
| 2,560,521 | A * | 7/1951 | Camp | 156/41 |
| 7,553,780 | B2 * | 6/2009 | Smith | 442/86 |
| 7,758,836 | B1 * | 7/2010 | Huggins et al. | 423/220 |
| 8,192,684 | B2 * | 6/2012 | Mason et al. | 422/37 |
| 8,328,910 | B2 * | 12/2012 | Mulholland | 95/136 |
| 2004/0209074 | A1 * | 10/2004 | Randall et al. | 428/341 |
| 2005/0246993 | A1 * | 11/2005 | Colbert et al. | 52/459 |
| 2008/0176050 | A1 * | 7/2008 | Lintz et al. | 428/213 |
| 2010/0229497 | A1 * | 9/2010 | Boisselle et al. | 52/741.3 |
| 2010/0310418 | A1 * | 12/2010 | Mason et al. | 422/37 |
| 2011/0117001 | A1 * | 5/2011 | Huggins et al. | 423/244.02 |
| 2011/0185900 | A1 * | 8/2011 | Mulholland | 95/92 |

* cited by examiner

Primary Examiner — Christine T Cajilig
(74) Attorney, Agent, or Firm — Brooks Kushman P.C.

(57) ABSTRACT

Odor emissions from improperly prepared Chinese drywall commonly termed "Chinese drywall" are reduced by the use of a hydrophobic coating on preferably both sides of the drywall, and by positively ventilating air from between the joists onto which the drywall is mounted.

6 Claims, 4 Drawing Sheets

CHINESE DRYWALL FIX

CROSS-REFERENCE TO RELATED APPLICATIONS

This application claims the benefit of U.S. provisional Application No. 61/632,453 filed Jan. 24, 2012. The disclosure of which is incorporated in its entirety by reference herein.

BACKGROUND OF THE INVENTION

1. Field of the Invention

The present invention relates to solving emissions problems, particularly of sulfur compounds, from improperly prepared drywall (gypsum board).

2. Background Art

"Chinese Drywall" has been used to refer to defective or tainted drywall imported from China from 2001 to 2007 which emits sulfur gases which usually create a noxious odor and corrode copper and other metal surfaces, thereby damaging air conditioners, electrical wiring, copper plumbing, appliances and electronics. Chinese drywall can also cause adverse health effects, although experts disagree whether these effects are merely irritants or present a more imminent or chronic health hazard. Not all drywall manufactured in China is defective, and it is believed that drywall exhibiting the same problem has also been produced domestically.

While the material source of the problem is known, a complete understanding of the cause of the problem remains unknown, which is likely due in part because different mines were involved, there were different manufacturing processes, and different types of construction and building materials were used.

Initially, the most common theory was that the drywall was manufactured in gypsum mines in China and also incorporated fly ash, a waste material that is a byproduct from power plants using coal. Samples of Chinese drywall tested by United Engineering, however, consisted of 5-15% organic material, which contradicts the theory that Chinese drywall was made of waste from coal fired power plants. It is now believed that the tainted drywall from China comes from mined gypsum, not synthetic gypsum which is made from coal ash. Mined gypsum contains high levels of strontium, which is visible as inclusions in electron scanning microscopy.

Another theory is that Chinese drywall contains bacteria (possibly from the water source used to manufacture the drywall) which degrades iron and sulfur compounds to produce sulfur odors, although the CPSC's recent report disputes this theory.

There is no question that the gasses emitted from Chinese drywall corrode copper and metal surfaces. Corrosion of electrical wiring may hamper the effectiveness of smoke detectors, which clearly presents a safety concern. Low level arcing has also been observed in some homes with Chinese drywall, which could cause an electrical fire.

Chinese drywall was found by Lawrence Berkely National Laboratories to emit hydrogen sulfide up to 100 times greater than conventional drywall. Hydrogen sulfide is a hazardous gas which, in high concentrations, can be fatal. There is also a strong association between hydrogen sulfide and metal corrosion. Analytical testing of Chinese drywall samples have revealed strontium sulfide, although there remains disagreement regarding whether strontium is a valid marker for Chinese drywall. According to Dr. Patricia Williams, a University of New Orleans toxicologist, highly toxic compounds have been found in Chinese drywall and prolonged exposure to these compounds can cause serious problems.

Strontium sulfide may be dangerous to developing children, as it affects bone growth. Chronic exposure to sulfur-containing gases may affect the central nervous system (including visual and sensory changes), cardiovascular system, eyes, kidneys, liver and skin. Infants, children, the elderly and infirm (particularly those with heart and lung disease and diabetes) and pets may have an increased vulnerability to these gases and the particulates that are released from the drywall. To date, the Florida Department of Health still maintains that the levels found in Chinese drywall are not high enough to present "an imminent or chronic health hazard at this time." Many experts disagree.

Chinese drywall is very friable, which means it is in a state where small particles can easily become dislodged with little friction. For this reason, even after Chinese drywall is removed, the toxic drywall particulate may remain unless property removed. Further, the particulate from Chinese drywall may invade and adhere to other building materials in the home's structure and personal objects within the home. Thus, cross-contamination should be factored into any remediation protocol. According to the Florida Department of Health, it is possible for gases to be absorbed and to be re-emitted from porous materials such as drywall and fabrics. The effectiveness of cleaning these materials is currently unknown. It is also unknown whether there is any effect on concrete and lumber.

Hundreds of millions of sheets of Chinese drywall were imported from 2004 to 2006, but Chinese drywall has recently been found in homes built or remodeled as early as 2001. Accordingly, this phenomenon cannot be explained solely by the shortage of American-manufactured drywall. The presence of Chinese drywall has been reported in 37 states, the District of Columbia and Puerto Rico, and is estimated to have been installed in over 100,000 homes in the United States. Unfortunately, this does not paint an accurate picture as most affected homes have a mixture of safe and tainted drywall.

Chinese drywall is ½" in width, although according to Lori A. Streit, Ph.D., from Unified Engineering, the same compounds found in problematic Chinese drywall and the same gases released from there have also been found in drywall measuring ⅝" (which is typically used in ceilings). Chinese drywall is typically mixed in with untainted drywall, which is why people should not assume that their home is fine if they find U.S. drywall. Moreover, U.S. drywall may have been manufactured in China and rebranded.

One of the telltale signs of Chinese drywall is corrosion/pitting of the air conditioner evaporator coils (which are located inside the air handler). Many owners are first advised of a freon leak, and as the corrosion progresses, evaporator coils eventually need replacement. An examination of the coils typically (but not always) reveal a black sooty deposit, which may also appear on the Freon line.

Chinese drywall also corrodes electrical wiring, as shown by blackened ground wires. Since many homes have mixed drywall (i.e. good and bad drywall), not all ground wires will show blackening. Signs of electrical problems include circuit breakers which frequently need resetting without an apparent cause (particularly a GFCI or AFCI); lights that flicker without any apparent cause; bright flashes or sparks anywhere in the electrical system (this may indicate arcing conditions in the wiring); buzzing from electrical systems, switch plates, dimmers, and outlet covers that are discolored from overheating; and a smell from overheating plastic.

SUMMARY OF THE INVENTION

It would be desirable to mediate or eliminate the effects associated with Chinese drywall without the necessity of removing the drywall, which has been widely practiced as the only means of remediation. These and other objects have been obtained by a process involving coating the drywall with a coating which serves as a moisture barrier and a barrier to transmission of hydrogen sulfide, preferably also employing a vapor collection and treatment system.

DETAILED DESCRIPTION OF THE PREFERRED EMBODIMENT(S)

Figure 1:
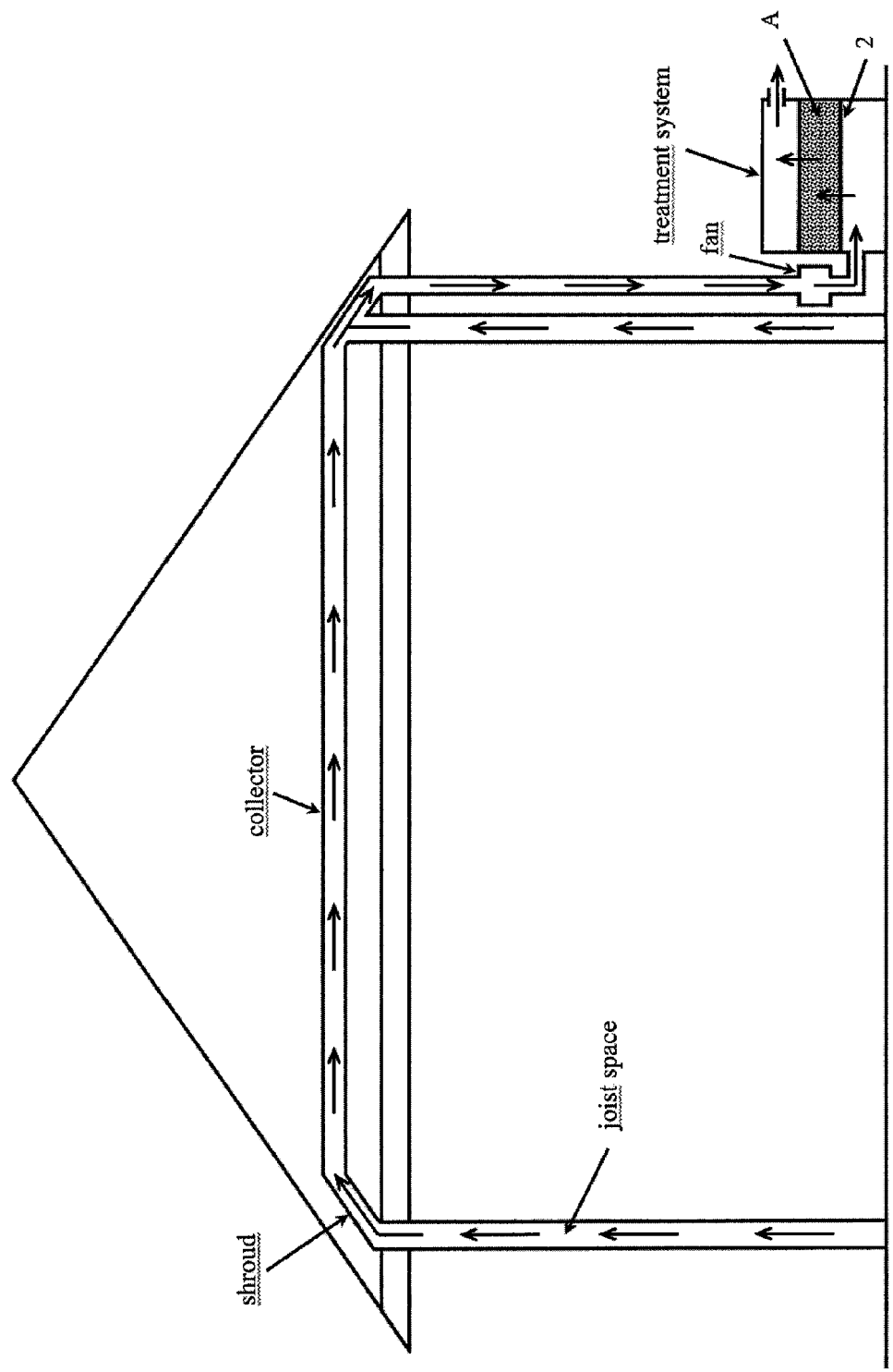
FIG. 1 illustrates one embodiment of a positive ventilation system.

In a first embodiment of the invention, the drywall, either in its native (unpainted) state or after having been painted with conventional paints, is coated with a coating which serves both as a moisture barrier to inhibit ingress of water, which both weakens the drywall and accelerates formation of noxious gases, and also preferably prevents or reduces the rate at which gases diffuse out of the drywall. The coating is preferably applied to native drywall, where the coating may penetrate the paper covering of the drywall, also decreasing its porosity. However, it may also be applied over previous coatings.

The coating may be applied by any convenient method, such as brushing, rolling, or spraying. It is preferably that cut surfaces of the drywall, for example those which have been cut for electrical boxes and the like, also be coated. These cut surfaces are transverse to the plane of the drywall and have no paper cover. Thus, these surfaces provide an easy path for the emission of noxious gases. By "backside of the drywall" is meant the side facing away from the enclosed living or working space, e.g. facing the building joists.

The coating must be a hydrophobic or water resistant coating to provide the required moisture barrier function. As indicated previously, when moisture penetrates Chinese drywall it serves to considerably weaken the drywall, much more so than in ordinary drywall. The moisture also increases the rate of formation of noxious gases, predominately hydrogen sulfide, but also very likely lower mercaptans and sulfides such as methyl mercaptan and dimethylsulfide. The coating material can be selected from among a wide variety of coating compositions. The coating preferably dries to a coherent film which is suitable, after drying, to accept ordinary oil-based and latex paints. One suitable coating material is 2 N31.3 C.S.R. Encapsulant, from Jema-American, Inc., Middlesex, N.J. Suitable coatings generally contain hydrophobic substances which remain after application and evaporation of solvents, etc.

Further suitable coating materials are silicone-containing latex paints. The silicone may exist separately in the emulsion, for example isooctyltrimethoxysilane, alkoxy-functional organopolysiloxanes, etc., or may be present in the polymer of the emulsion, for example, silicone-modified styrene/acrylates, polyvinylacetates, and the like. Substantially any polymer useful as a paint binder can be modified during free radical initiated emulsion polymerization of the polymer by copolymerizing an unsaturated silane such as vinyltriethoxysilane or a vinyl-terminated or vinyl-pendant organopolysiloxane. Such modified binders are widely commercially available for example from Kuraray and from Wacker Chemie. By the term "water resistant" herein is meant a coating which forms an effective barrier to moisture, or "moisture barrier."

The coating composition preferably contains one or more sulfur scavengers. These include scavengers for $H_2S$, $SO_2$, and mercaptans. Suitable scavengers are well known, and are generally compounds which form non-volatile reaction products or adducts with the sulfur-containing compounds. For $SO_2$ gas, for example, alkaline reactants such as alkali and alkaline earth carbonates, oxides, and hydroxides can be used, for example sodium carbonate, potassium carbonate, magnesium carbonate, calcium carbonate, magnesium oxide, magnesium hydroxide, calcium hydroxide, or the analogous basic ammonium salts. For $H_2S$ and mercaptans, metallic silver, activated carbon, zinc oxide, iron oxide, ferric oxide-impregnated activated carbon, organic amines and polyamines, melamine, melamine/formaldehyde condensates, and triazines, such as 1,3,5-triazine and hexahydrotriazine. A number of porous clay mineral products and zeolites are also potentially useful. The amount should be effective to lower emissions, for example as indicated by comparing discoloration of fresh copper coupons when exposed to heat, water, and coated and uncoated drywall samples enclosed in respective sealed plastic containers maintained at 38° C. for two weeks. Reduction of emissions can be determined by visual observation of the discoloration of the coupon exposed to untreated drywall with the discoloration of the coupon exposed to coated drywall. A darker discoloration indicates increased corrosion, and thus higher sulfur emissions. More quantitative results are not ordinarily necessary, but may be obtained by use of Scanning Electron Microscope—Energy Dispersive X-Ray Spectroscopy (SEM-EDS) by standard techniques.

The amount of scavenger which is effective varies on a weight percentage basis, due to different efficiencies of the scavenger in the coating. The higher level of scavenger, the greater the efficiency in scavenging the sulfur compounds. The amount is preferably from 0.5 to 20 weight percent based on the weight of the total coating composition, more preferably 1 to 10 weight percent. However, if the scavenger can take the place of a portion of one of the other formulation ingredients, for example a pigment or filler, then it can be present in much larger amounts, for example, in increasing preference, >20%, >30%, >40%, >50%, or >60%. The formulation must contain sufficient organic binder to form a coherent coating. The coating composition may be oil-based or aqueous.

The coating most preferably is applied to both sides of the drywall, that is not only the portion facing the interior of the building ("front side"), but also that facing the studs, etc. ("backside"). The coating may be applied on the non-interior surface by forming small holes in the drywall and inserting a spray wand into the hole. It may be substantially impossible to coat 100% of the non-interior side, but a coating which is as thorough as possible is desirable. The entry holes are then sealed.

The first embodiment is effective to reduce sulfur emissions, but in a structure which is not well ventilated, or which remains closed for extended periods of time, there may still be a slow buildup of sulfur compounds. This buildup is dealt with by the second embodiment, which is preferably used in conjunction with the first embodiment.

In the second embodiment, the back side (non-interior side) of the drywall is positively ventilated. The ventilation air is collected and chemically treated to remove contaminants. The chemical treatment system is advantageously located outside the structure, but may also be located inside, for example in a basement, crawl space, attic, or garage, which is not preferred, however. The chemical treatment system may contain a scrubber for sulfur compounds, such as a solution of alkali metal carbonate or hydroxide, calcium hydroxide, or the like. Solutions and reagents for absorbing sulfur compounds are well known, and are widely used in industrial processes which generate sulfur compounds, including coal burning power plants, oil-fired power plants burning high sulfur content oil, sewage treatment facilities, and the like. The scrubbing solution is periodically replaced, and the spent solution is treated and disposed of employing good disposal practices.

Chemical reactive absorbants may also be used, e.g. in the form of a packed tower. Chemical compounds in granular or larger form, which react with sulfur compounds, are contained therein. The chemical compounds may include an oxidant such as sodium or calcium hypochlorite, to oxidize the sulfur to a sulfite or sulfate.

Preferably, however, the treatment system is a canister of activated charcoal (activated carbon). Activated charcoal is inexpensive and is capable of effectively absorbing volatile sulfur compounds. Combinations of the above treatment methods may be used.

The ventilation air is positively removed from the structure. This may be accomplished by a blower, which does not have to be of great size, but which creates a minor lowering of air pressure between the joists. This slight reduction of air pressure allows air to be drawn in from the interior space through unavoidable spaces between, for example, base molding and the floor, and through electrical outlets, switch plates, and the like. The slight decrease in pressure also prevents the "backwards" migration of gases given off by the drywall backside into the living space. The lowered pressure may be, for example but not by limitation, from 0.1 to 50 torr below the prevailing pressure, more preferably from 1 ton to about 20 torr. The pressure difference should result in a continuous flow of ventilating air without generating a large volume of air to be treated by the treatment apparatus.

To facilitate air flow through the space between the joints, the top plate and sill plate may have holes drilled therein. It is preferably to provide such holes only on the side (top, bottom) of the wall structure where ventilation gas is collected. If holes are provided in both top plate and sill plate, the holes should be much smaller on the side not connected to the ventilating blower, such that air will still enter the drywall from the structure interior, e.g. from holes for electrical components as described earlier. It may be advantageous to provide such holes between joists on the non-blower side in portions of the wall having no openings for electrical components in that wall portion, and with no holes in the latter portions which do have such openings. This will ensure that air is drawn through electrical openings, thus protecting the copper wires in these openings from being attacked by sulfur compounds.

Preferably, a shroud, which may be of elastomer, plastic, metal, etc., lies on top of the top plate or below the sill plate, or adjacent to the top plate or sill plate, to serve as a collector of contaminated air. For this purpose, there must be passages in the top plate or sill plate which are in communication with the interior of the shroud and the interior space of the joists. The shroud is preferably sealed at its edges in contact with the structure such that a good flow of air from between the joists flows into the shroud, as opposed to severe leakage which draws fresh air into the shroud. The shroud is connected to the "vacuum" side of the blower. A series of shrouds may be used, attached separately to the blower, or the shrouds may be interconnected and but a single or low plurality of portions of the shroud are then connected to the blower. Other methods of collection and respective collectors may also be used, for example plastic tubing, etc.

In operation, the blower creates a small difference in pressure, collects contaminated air, and blows this air through the treatment system. Air within the interior of the structure flows gradually into the space between the joists, and fresh air from the outside of the structure enters in the normal way. The air is continually refreshed. Thus, not only does the invention effectively remove contaminated air from between the joists, but contamination resulting from diffusion of sulfur compounds and the like into the interior space from the interior surface (frontside) of the drywall is removed as well. The system need not operate continuously. It may have, for example a 10-100% duty cycle, more preferably a 20-60% duty cycle. Having a reduced duty cycle lowers the transfer of air conditioned or heated air from the structure, thus lowering energy consumption, and reduces the amount of air needed to be treated to remove sulfur compounds. The system may also have a "plural mode" duty cycle, where a very low difference in pressure is created, for example for most of the total duty cycle, and a greater difference in pressure for some part, i.e. 5-30% of the total duty cycle. This can be accomplished, for example, by a multiple speed blower.

The type of blower is not critical, and can be, for example, a squirrel cage fan, a centrifugal blower, a "propeller"-type fan, etc. The size of the blower is chosen based on common HVAC calculations based on the pressure differential to be achieved, the interior volume of the building, the wall surface area (exterior and interior walls). Horsepower may range, for example, from ⅛ horsepower or ¼ horsepower in relatively small structures to much larger units in large buildings.

EXAMPLE

Figure 2:
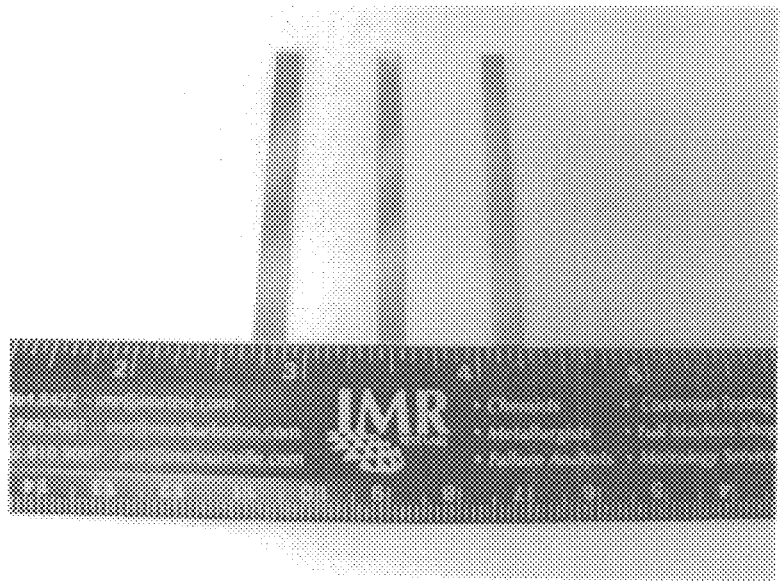
FIGS. 2 and 3 are pictures of copper test coupons prior to and after exposure to drywall samples.
Figure 3:
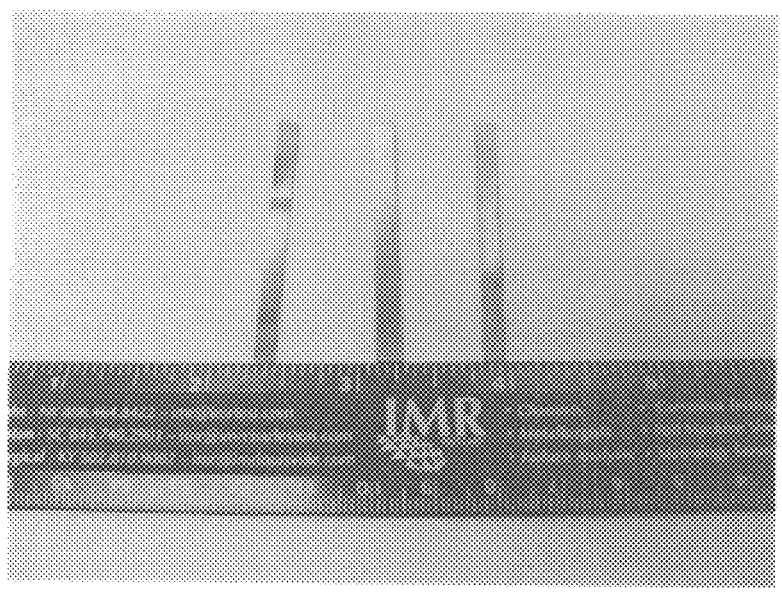
Figure 4:
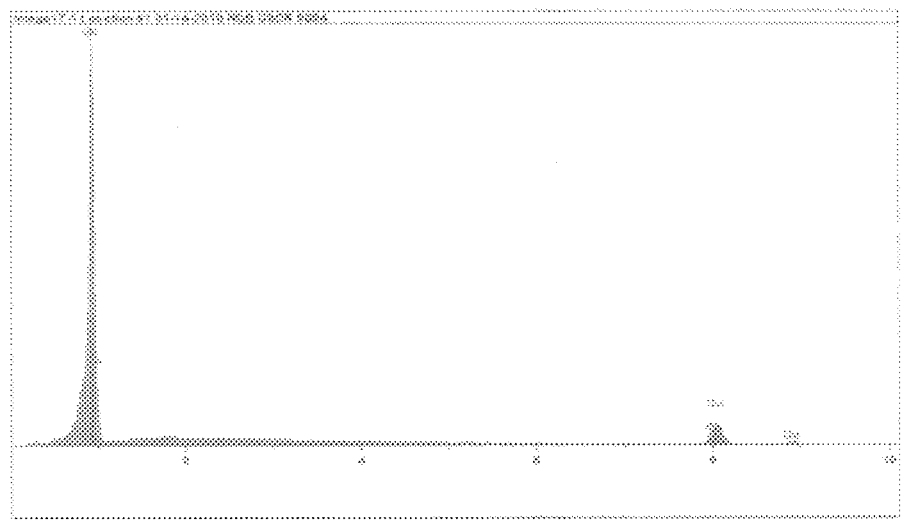
FIGS. 4 to 7 are SEM-EDS spectra of the test coupons of FIGS. 2 and 3.
Figure 5:
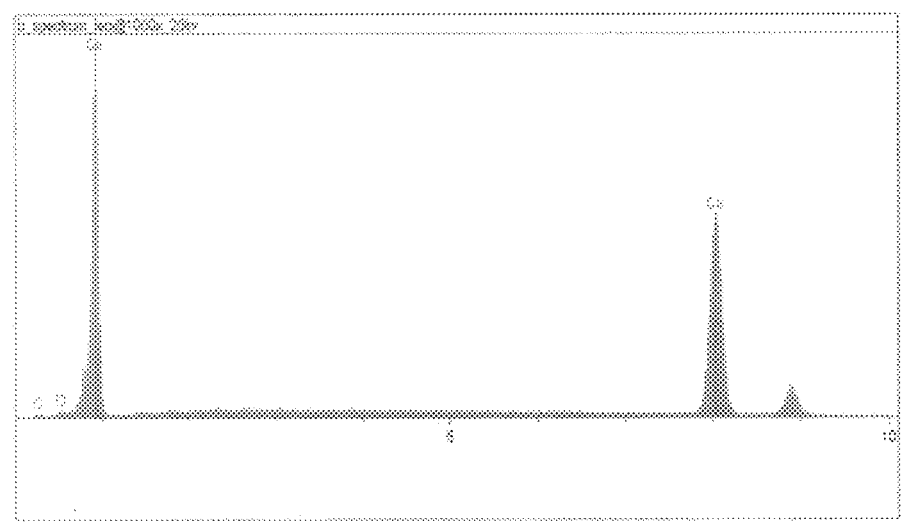
Figure 6:
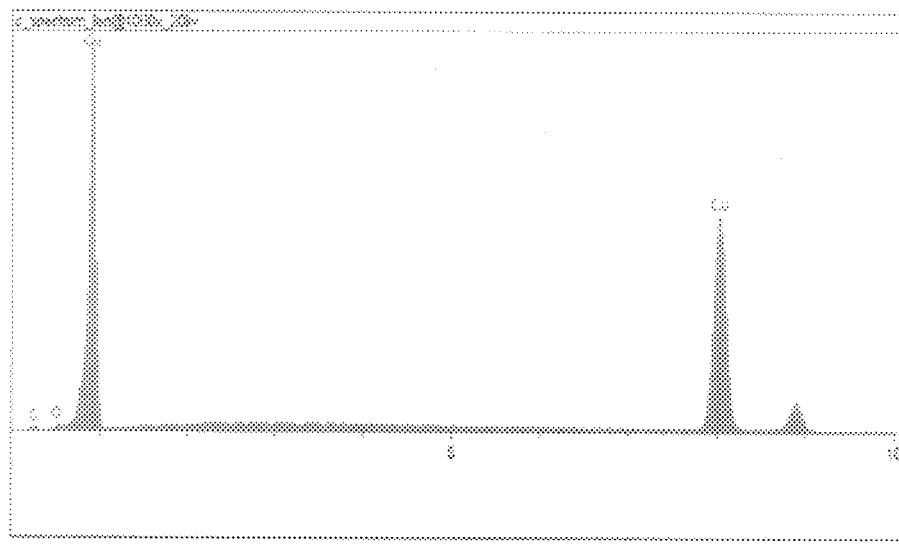
Figure 7:
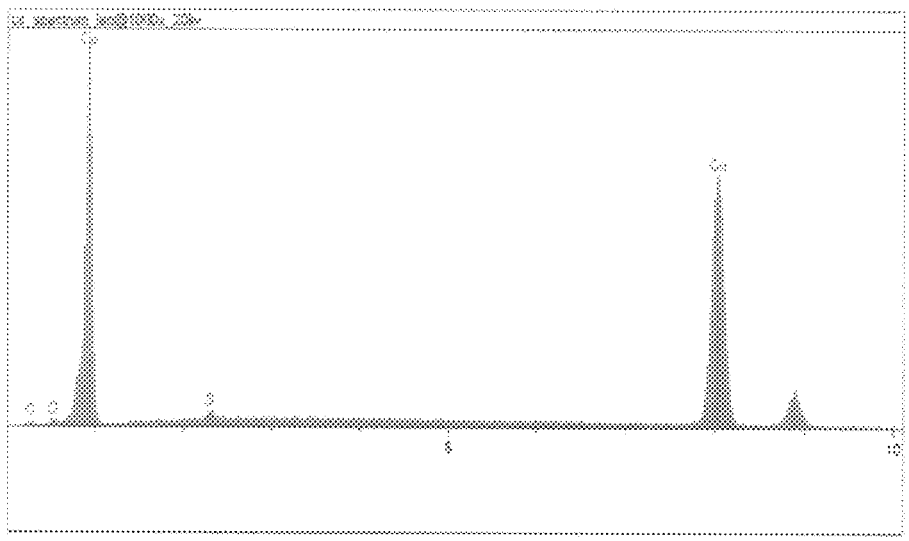

Coupons of copper were photographed (FIG. 2) and analyzed by SEM-EDS (FIG. 4). The coupons were initially bright, and the SEM-EDS spectra showed predominant peaks for copper. The test coupons were then exposed to drywall samples B, C, and CC. Drywall sample B was a drywall of U.S. manufacture, not known to have sulfur emission problems. Samples C and CC were drywall samples known to have sulfur emissions. Each drywall sample, faces and cut ends, were coated with a coating modified to contain a sulfur scavenger. The coating on drywall sample CC contained less scavenger than the coating on drywall sample C. The coupons were placed in plastic bags with the respective drywall samples and water, and maintained at 38° C. for two weeks. Photographs of the coupons were then taken, along with SEM-EDS analysis. Unfortunately, the color photographs of the samples do not reproduce well, but sample B remained shiny, with no deposits visually discernible. The SEM-EDS spectra showed no peak for sulfur (FIG. 5). Sample C showed modest discoloration, but the SEM-EDS spectra (FIG. 6) showed no peak for sulfur, indicating that sulfur emissions are effectively curtailed. Sample CC showed much greater discoloration, and a notable sulfur peak in the SEM-EDS spectrum (FIG. 7), showing some sulfur emission. Not shown are coupons similarly exposed to drywall C but without any coating. These coupons showed severe discoloration (black), and the SEM-EDS spectrum showed an appreciable peak for sulfur.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for reducing sulfur emissions from an installed, sulfur-emitting drywall product, comprising: coating at least the backside surface of the drywall with a hydrophobic coating composition while in an installed state.

2. The method of claim 1, wherein the coating composition contains a sulfur reducing effective amount of at least one sulfur scavenger.

3. The method of claim 1, further comprising coating cut surfaces of the drywall with the hydrophobic coating composition.

4. The method of claim 1, further comprising:
positively ventilating sulfur-contaminated air from spaces adjoining the backside of the drywall by a positive ventilation system, exhaust air from the positive ventilation system passing through a chemical treatment system effective to remove sulfur compounds from the exhaust gas.

5. The method of claim 4, wherein the exhaust gas is treated by passing the exhaust gas through an activated charcoal filter.

6. The method of claim 4, further comprising at least one ventilation air-collecting shroud attached to the vacuum side of a blower which reduces pressure in the shroud, an interior of the shroud in communication with interior joist space of a wall.

* * * * *